United States Patent [19]
Ishiharada et al.

[11] Patent Number: 5,638,480
[45] Date of Patent: Jun. 10, 1997

[54] OPTICAL WAVEGUIDE HOSE

[75] Inventors: Minoru Ishiharada, Kodaira; Itsuo Tanuma, Sayama; Kazuo Naito, Kawasaki, all of Japan

[73] Assignee: Bridgestone Corporation, Tokyo, Japan

[21] Appl. No.: 538,268

[22] Filed: Oct. 3, 1995

Related U.S. Application Data

[63] Continuation-in-part of Ser. No. 220,980, Mar. 31, 1994, abandoned.

[30] Foreign Application Priority Data

Apr. 1, 1993 [JP] Japan ................................. 5-098603

[51] Int. Cl.$^6$ ................................................ G02B 6/20
[52] U.S. Cl. ..................... 385/125; 385/100; 385/123; 385/147; 385/141
[58] Field of Search ............................. 385/100, 125, 385/123, 147, 141

[56] References Cited

U.S. PATENT DOCUMENTS

| | | | |
|---|---|---|---|
| 3,920,980 | 11/1975 | Nath | 385/125 X |
| 3,995,934 | 12/1976 | Nath | 385/125 X |
| 4,009,382 | 2/1977 | Nath | 385/125 X |
| 4,045,119 | 8/1977 | Eastgate | 385/125 X |
| 4,747,662 | 5/1988 | Fitz | 385/125 X |
| 4,801,187 | 1/1989 | Elbert et al. | 385/125 X |
| 4,927,231 | 5/1990 | Levatter | 385/125 X |
| 4,930,863 | 6/1990 | Croitoriu et al. | 385/125 X |
| 5,165,773 | 11/1992 | Nath | 385/125 |
| 5,267,341 | 11/1993 | Shearin | 385/125 |
| 5,333,227 | 7/1994 | Ishiharada et al. | 385/100 |
| 5,497,440 | 3/1996 | Croitoru et al. | 385/125 |
| 5,546,493 | 8/1996 | Noguchi et al. | 385/125 |

FOREIGN PATENT DOCUMENTS

| | | | |
|---|---|---|---|
| 3704871 | 8/1988 | Germany | 385/125 X |

*Primary Examiner*—Brian Healy
*Attorney, Agent, or Firm*—Sughrue, Mion, Zinn, Macpeak & Seas

[57] ABSTRACT

An optical waveguide hose includes a hollow tubular cladding made of a material having rubber elasticity at the service temperature of −50° to 150° C. and having a lower creep. The cladding is filled with a core fluid having a higher index of refraction than the cladding and closed with sealing plugs at opposed open ends. The hose is improved in flexibility and handling, prevents gas penetration into the core fluid, maintains transparency at widely varying temperature over a long time, and is lightweight and inexpensive.

8 Claims, 2 Drawing Sheets

OPTICAL WAVEGUIDE HOSE

CROSS REFERENCE TO RELATED APPLICATION

This application is a continuation-in-part of application Ser. No. 08/220,980 filed on Mar. 31, 1994, now abandoned, the entire contents of which are hereby incorporated by reference.

BACKGROUND OF THE INVENTION

1. Field of the Invention

This invention generally relates to an optical waveguide hose having a fluid core, and more particularly, to an optical waveguide hose having a fluid core which is designed to prevent penetration of gas into the core so that the hose may maintain its function over a wide temperature range and a long period of time and which has high flexibility.

2. Prior Art

Prior art well-known fiber optics include optical fibers of inorganic glass systems such as quartz glass and multi-component glass and optical fibers of plastic systems such as polymethyl methacrylate and polystyrene. These are all solid optical fibers wherein both the core and the cladding are solid materials. Although these optical fibers have satisfactory characteristics, they are limited in flexibility because they are formed from glass or hard plastics. Also, when it is desired to increase the diameter for transmitting a large quantity of light, a plurality of optical fibers each having a diameter of about 10 to 1,000 μm must be bundled. The optical fiber bundle has a space left among fibers even when fibers are packed at a possible maximum packing density and thus has a reduced effective inlet surface area for receiving light. The bundle is then loss efficient and rather expensive.

As one solution to the all solid optical fibers, the inventors proposed an optical waveguide hose using a normally liquid light transmitting medium in U.S. Pat. Nos. 4,009,382 and 3,814,497. The liquid system optical fiber includes a cladding in the form of a flexible hollow tube and a liquid core therein having a higher index of refraction than the cladding. Opposite end openings of the cladding are closed with window members. This allows the fiber to have a large diameter and a large effective light-receiving area and the fiber is thus highly efficient and cost effective.

Although the liquids system optical fiber had excellent features as mentioned above, it had the problem that since its stiffness is provided by a cladding in the form of a flexible hollow tubular member, gases can penetrate into the core liquid to lower its transparency due to a change in the service environment temperature during a long period of use. This is because the core is liquid and thus has a higher coefficient of expansion than the hollow tubular cladding generally formed of resinous material. At low temperatures, the volume of the core liquid is smaller than the interior volume of the cladding so that the hollow interior of the cladding is under negative pressure to allow gases to penetrate thereto through the cladding wall, creating bubbles in the core liquid. Bubble formation is facilitated particularly when the temperature is once elevated and then decreased.

UK Patent No. 1,450,608, for example, proposed a liquid system optical fiber which had solved the gas penetration problem. This optical fiber is provided with a core liquid reservoir connected to the hollow tubular cladding. The reservoir makes up the core liquid when the core liquid decreases its volume at low temperatures, preventing the hollow interior of the cladding from becoming negative in pressure and thus preventing gas penetration into the core liquid.

This optical fiber, however, required to form an aperture in the cladding for liquid communication before the reservoir could be connected to the hollow tubular cladding. This aperture caused light scattering and detracted from transparency. The attachment of the reservoir added to the weight and cost.

SUMMARY OF THE INVENTION

An object of the present invention is to provide a novel and improved optical waveguide hose which is improved in flexibility and handling, which prevents gas penetration into the core fluid and thus maintains transparency in a wide temperature range over a long period of time, and which is lightweight and inexpensive.

In connection with an optical waveguide hose wherein a hollow tubular cladding is filled with a core fluid having a higher index of refraction than the cladding and opposite end openings of the cladding are closed with sealing plugs, the inventors have found that when the cladding is made of a material which exhibits rubber elasticity at the service temperature of −50° to 150° C. of the hose and has a lower creep factor, and has a smoothed inner surface, the cladding material having rubber elasticity can accommodate a change in the internal pressure resulting from a change in an environment temperature due to a difference in coefficient of thermal expansion between the core fluid and the cladding material. More particularly, at low temperature, the internal pressure lowers toward negative, but the tube is deformable enough to mitigate the internal pressure drop. As the temperature rises, the core material increases its volume and the cladding can follow expansion by elastic deformation. When the temperature then drops again, the cladding follows contraction of the core. In this way the internal pressure is maintained. It never happens that the hollow interior of the cladding becomes negative in pressure and gases penetrate through the cladding wall to develop bubbles in the core fluid. Then an optical waveguide hose which remains transparent over a wide range of temperature and flexible even at a large diameter can be manufactured at low cost.

DETAILED DESCRIPTION OF THE INVENTION

The optical waveguide hose of the invention includes a hollow tubular cladding made of a material which exhibits rubber elasticity at the working temperature of −50° to 150° C. of the hose and has a lower creep factor. The cladding has a smoothed inner layer. The cladding is filled with a core of a fluid having a higher index of refraction than the cladding. A sealing plug is mated with each end opening of the cladding.

Figure 1:
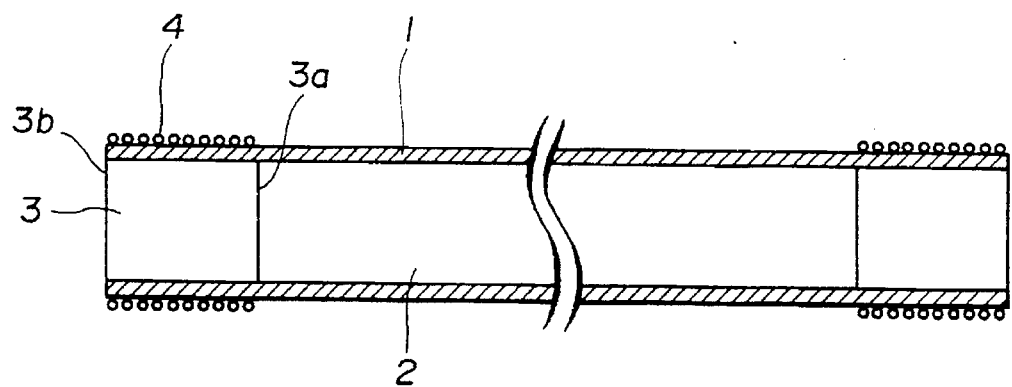
FIG. 1 is a schematic axial cross section of an optical waveguide hose according to one embodiment of the invention.

Referring to FIG. 1, there is illustrated a basic structure of an optical waveguide hose according to the present invention. The hose is shown in FIG. 1 as comprising a hollow tubular cladding 1 having opposite end openings, a fluid core 2 filled in the cladding 1, and a sealing plug 3 mated with each end opening of the cladding 1 for closing the openings for maintaining the interior pressure of the cladding hollow interior. A clamp 4 is fastened around each cladding end for preventing release of the sealing plug 3 and leakage of the core fluid.

The hollow tubular cladding 1 is made of a material which exhibits rubber elasticity over its entirety at the working temperature (usually −50° to 150° C., especially −30° to 120° C.) of the hose. Of course, it is preferred that the cladding material be shapable into a tubular form, have a low index of refraction and be resistant against attack by the core fluid. It is also preferred that the cladding material have sufficient gas barrier properties to prevent gas permeation. A choice of a cladding material having no substantial difference in coefficient of thermal expansion from the core fluid provides a synergistic effect coupled with its rubber elasticity. In this regard, it is preferred to use a cladding material having a coefficient of thermal expansion which is 0.5 to 3 times that of the core fluid.

More preferably, the cladding material has a lower glass transition temperature (Tg) than the service temperature and has been physically and chemically crosslinked for preventing creep, especially having low creep at the maximum service temperature. The cladding material has a creep factor of up to 50%, preferably up to 10%. The creep factor is defined as $X=(L_2-L_1)/L_1\times 100\%$ wherein $L_1$ is the initial length of a test member and $L_2$ is the length of the test member after elongation. More specifically, a creep test uses a member of cladding material having a length $L_1$ at 20° C. The member is stretched 100%, that is, to a length twice the initial length $L_1(2\times L_1)$ at 120° C. and maintained under these conditions for one hour. After cancellation of the stretching force and heating, the member is allowed to recover to a length $L_2$ at 20° C.

Preferred cladding materials include silicone rubbers such as dimethylsiloxane rubbers and methylphenylsiloxane rubbers, fluorosilicone rubbers, and fluororubbers such as polyvinylidene fluoride rubbers, vinylidene fluoride-trifluoroethylene chloride rubbers, vinylidene fluoride-propylene hexafluoride rubbers and vinylidene fluoride-propylene hexafluoride-ethylene tetrafluoride rubbers. They are crosslinked and should has a creep factor of 50% or less, preferably 10% or less.

These cladding materials may be used alone or in admixture of two or more and formed as a single tube or multiple tubes. The inner surface of the cladding in contact with the core fluid is smoothed for the purpose of preventing swelling of the core fluid, light scattering, and gas entry. The inner surface of the cladding should preferably have a surface roughness (Ra) of 0.5 µm or less, preferably 0.3 µm or less, more preferably 0.1 µm or less, most preferably 0.05 µm or less. The smoothing treatment includes coating, double extrusion, treatment of the interior surface with reactive gas such as $ClF_3$, and surface treatment by plasma initiated polymerization.

Among these treatments, the coating method is advantageous since it is relatively easy to form a coating layer on the interior surface of the cladding tube. The coating materials suitable to this end include precursors of the above-mentioned rubber elasticity materials, especially fluororubber, and fluorosilicone rubber in solution or liquid form. The coating layer is preferably about 1 to 1000 µm thick.

For protecting the optical waveguide hose, the cladding on the outer surface may be covered with a coating material. For example, the cladding tube may be coated with any of plastics and elastomers. Alternatively, any of metal materials such as stainless steel and aluminum, plastics, and elastomers is shaped into an elongated hollow member in the form of a pipe, bellows or spirally wound wire, and the optical waveguide hose is inserted into the hollow member. It is also possible to form a thin layer of inorganic material on the outer surface of the cladding by plating, evaporation and sputtering.

These coating materials may be used alone or in combination with another material to form a composite cover.

The core fluid 2 with which the hollow interior of the tubular cladding 1 is filled is a liquid or flowing transparent material (fluid) having a higher index of refraction than the cladding material. Exemplary fluids include aqueous solutions of inorganic salts, polyhydric alcohols such as ethylene glycol and glycerine, silicone oils such as polydimethylsiloxane oil and polyphenylmethylsiloxane oil, hydrocarbons such as polyisobutylene, polyethers, polyesters, and liquid paraffin, halogenated hydrocarbons such as trifluoroethylene chloride oil, phosphates such as tris(chloroethyl) phosphate and trioctyl phosphate, and solutions of polymers (e.g., polyisobutylene) diluted with suitable solvents. Preferred core fluid is a silicone oil.

Figure 2:
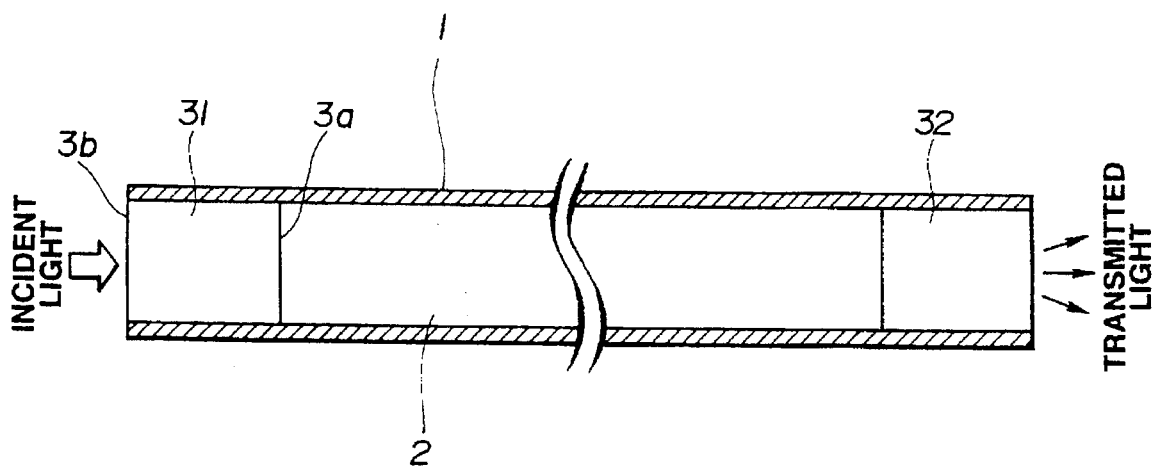
FIG. 2 is a schematic axial cross section of an optical waveguide hose according to another embodiment of the invention.
Figure 3:
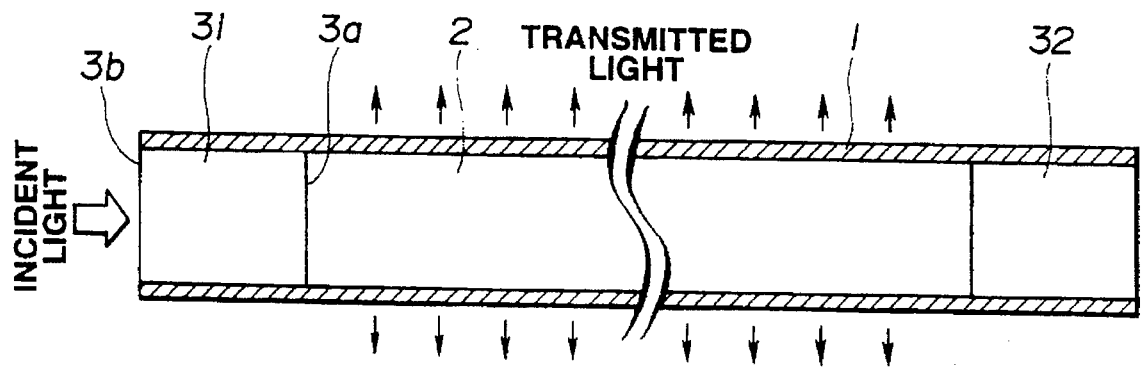
FIG. 3 is a schematic axial cross section of an optical waveguide hose according to a further embodiment of the invention.

The material of which the sealing plug 3 is made may be selected from inorganic glasses, organic glasses, metals, inorganic materials and plastics, depending on a particular purpose. In one exemplary embodiment wherein plugs 31 and 32 serve as an inlet window through which incident light enters the light waveguide hose and an outlet window through which the transmitted light emerges outside as shown in FIG. 2, both the plugs must be transparent. In another embodiment wherein light emerges outside from the hose in a radial direction through the cladding wall as shown in FIG. 3, the tail plug 32 need not be transparent.

The material of the plugs which must be transparent include inorganic glasses such as quartz glass, multi-component glass, sapphire, and quartz; and organic glasses and transparent plastic materials such as polyethylene, polypropylene, ABS resins, acrylonitrile-styrene copolymer resins, styrene-butadiene copolymers, acrylonitrile-EPDM-styrene terpolymers, styrene-methyl methacrylate copolymers, methacrylic resins, epoxy resins, polymethyl pentene, allyl diglycol carbonate resins, spiran resins, amorphous polyolefins, polycarbonates, polyamides, polyacrylates, polysulfones, polyallyl sulfones, polyether sulfones, polyether imides, polyimides, polyethylene terephthalate, diallyl phthalate, fluororesins, polyester carbonates, and silicone resins. Preferred among these are inorganic glasses such as quartz glass, Pyrex® glass and multi-component glass because they are transparent, heat resistant and chemically stable so that they are chemically inert to reaction with the core fluid in contact therewith at the inner end 3a of the plug 3 or with gases or moisture in contact therewith at the outer end 3b of the plug 3 (in FIG. 1) and thus maintain good performance over a long period of time.

Where transparency is not necessary, use may be made of metals and ceramic materials as well as the above-mentioned materials. Plugs of opaque material is preferably polished or provided with a reflective film at the surface in contact with the core fluid in order to reflect light thereat to increase light emission from the lateral side.

The end clamps 4 are preferably provided for preventing release of the plugs or leakage of the core fluid and for preventing gases from penetrating through the interface between the cladding and the plugs. The clamps may be hose bands, wires, sleeves, O-rings, gaskets or other suitable means which are fastened, wound, fitted or otherwise applied around the cladding ends and the plugs to accomplish a mechanical seal or another seal by thermal shrinkage, adhesion or curing.

Many benefits are obtained from the optical waveguide hose of the invention. The hose can be used in a wide temperature range from low to high temperatures since it maintains good light transmission over a wide temperature range. The hose can be mounted in a movable section of machinery such as a robot arm where bending and extension are required since it has sufficient flexibility. The hose is easy to install in a limited access area or within a machinery frame. For example, the hose finds application in electric appliances, vehicles and aircraft for light transmission and illumination, transmission of optical energy such as solar energy, and a variety of lighting purposes.

EXAMPLE

Examples of the present invention are given below by way of illustration and not by way of limitation.

Example 1

A hollow tubular cladding having an inner diameter of 6 mm, an outer diameter of 8 mm and a length of 3 m was formed from dimethylsilicone having a Tg of about −80° C. The cladding had a creep factor of 5%. The surface roughness (Ra) of the inner surface of the cladding was 0.4 µm. The cladding was charged with phenylmethylsilicone oil having a viscosity of 450 centipoise at 25° C. and an index of refraction of 1.50 from one open end. The cladding was plugged with quartz rod pieces having a diameter of 6 mm and a length of 30 mm at both ends. The cladding end portions were tightly clamped by winding a metal wire thereon. This optical waveguide hose had a transmittance of 60% to light having a wavelength of 633 nm.

The hose was allowed to stand in a refrigerator at −30° C. for 6 months. At the end of 6-month cold storage, the hose maintained high light transmittance without air penetration.

Example 2

A hollow tube having an inner diameter of 6 mm, an outer diameter of 8 mm and a length of 3 m was formed from dimethylsilicone having a Tg of about −80° C. The tube (cladding) had a creep factor of 5%. The tube on the inner surface as coated with fluororubber having a Tg of about −30° C. to a thickness of about 50 µm. The surface roughness (Ra) of the inner surface of the cladding having the coating at the inner surface was 0.03 µm. The cladding was charged with phenylmethyl-silicone oil having a viscosity of 450 centipoise at 25° C. and an index of refraction of 1.50 from one open end. The cladding was plugged with quartz rod pieces having a diameter of 6 mm and a length of 30 mm at both ends. The cladding end portions were tightly clamped by winding a metal wire thereon. This optical waveguide hose had a transmittance of 85% to light having a wavelength of 633 nm.

The hose was allowed to stand in a refrigerator at −30° C. for 6 months. At the end of 6-month cold storage, the hose maintained high light transmittance without air penetration. The hose was also subjected to a thermal cycling test between 120° C. and −10° C. for 500 hours. Again the hose maintained high light transmittance without air penetration.

Comparative Example

A hollow tubular cladding having an inner diameter of 6 mm, an outer diameter of 7 mm and a length of 3 m was formed from an ethylene tetrafluoride-propylene hexafluoride copolymer having a Tg of about 200° C. The cladding had a creep factor of 100%. The surface roughness (Ra) of the inner surface of the cladding was 0.03 µm. The cladding was charged with trioctyl phosphate from one open end. The cladding was plugged with quartz rod pieces having a diameter of 6 mm and a length of 30 mm at both ends. The cladding end portions were tightly clamped by winding a metal wire thereon.

This optical waveguide hose was allowed to stand in a refrigerator at −5° C. After two days, about 1 ml of air penetrated into the hose.

There has been described an optical waveguide hose comprising a hollow tubular cladding made of a material having rubber elasticity at the service temperature which is filled with a core fluid having a higher index of refraction than the cladding and closed with sealing plugs at opposed ends. The hose is improved in flexibility and handling, prevents gas penetration into the core fluid and thus maintains transparency in a wide temperature range over a long period of time, and is lightweight and inexpensive.

We claim:

1. An optical waveguide hose comprising a hollow tubular cladding having opposite end openings, a core of a fluid having a higher index of refraction than the cladding, the cladding being filled with the core fluid, and sealing plugs mated with the end openings of the cladding, characterized in that the cladding is made of a rubbery material which exhibits rubber elasticity at the working temperature of −50° to 150° C. of the hose and has a creep factor of 50% or less; and said cladding has a smoothed inner surface.

2. The optical waveguide hose of claim 1, wherein the smoothed inner surface has a surface roughness (Ra) of 0.5 µm or less.

3. The optical waveguide hose of claim 1, wherein the cladding has a creep factor of 10% or less.

4. The optical waveguide hose of claim 1, wherein the core of a fluid is a silicone oil and the cladding is comprised of a silicone rubber, fluorosilicone rubber or fluororubber having a creep factor of 10% or less.

5. The optical waveguide hose of claim 4, wherein the cladding has a coating layer of a fluorosilicone rubber or fluororubber having a surface roughness (Ra) of 0.3 µm or less at the inner surface thereof.

6. The optical waveguide hose of claim 1, wherein said working temperature is −30° to 120° C.

7. The optical waveguide hose of claim 1, wherein said cladding material has a coefficient of thermal expansion of from 0.5 to 3 times that of the core fluid.

8. An optical waveguide hose comprising a hollow tubular cladding having opposite end openings, a core of a fluid having a higher index of refraction than the cladding, the cladding being filled with the core fluid, and sealing plugs mated with the end openings of the cladding, characterized in that the cladding is comprised of a silicone rubber, fluorosilicone rubber or fluororubber which exhibits rubber elasticity at the working temperature of −50° to 150° C., has a creep factor of 10% or less, and has a coefficient of thermal expansion of from 0.5 to 3 times that of the core fluid, said cladding has a smoothed inner surface; and said core fluid is a silicone oil.

* * * * *